US012651239B2

(12) United States Patent
Saraf et al.

(10) Patent No.: US 12,651,239 B2
(45) Date of Patent: Jun. 9, 2026

(54) SYSTEMS AND METHODS FOR FRICTIONLESS PAYMENTS IN Web3 AND THE METAVERSE

(71) Applicant: JPMORGAN CHASE BANK, N.A., New York, NY (US)

(72) Inventors: Sanjay Saraf, Los Altos Hills, CA (US); Adit Gadgil, San Francisco, CA (US); Umar Farooq, New York, NY (US); Ratnavelsamy Kalyanasundaram, San Ramon, CA (US); Tyrone Lobban, London (GB); Giacinto Cosenza, London (GB); George Kassis, London (GB); Abbas Ali, London (GB); Jodie Caston, London (GB); Arulsenthilkumar Shanmugam, Antioch, CA (US); Kirsten Jones, Southbourne (GB); Nicole Parina, New York, NY (US); Nancy Nugent, New York, NY (US); Aditya Mayur Taday, Hoboken, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 489 days.

(21) Appl. No.: 18/308,528

(22) Filed: Apr. 27, 2023

(65) Prior Publication Data

US 2023/0351353 A1 Nov. 2, 2023

Related U.S. Application Data

(60) Provisional application No. 63/363,858, filed on Apr. 29, 2022.

(51) Int. Cl.
| | |
|---|---|
| *G06Q 20/12* | (2012.01) |
| *G06Q 20/36* | (2012.01) |
| *G06Q 20/38* | (2012.01) |

(52) U.S. Cl.
CPC ........... *G06Q 20/123* (2013.01); *G06Q 20/36* (2013.01); *G06Q 20/381* (2013.01);
(Continued)

(58) Field of Classification Search
CPC .... G06Q 20/123; G06Q 20/36; G06Q 20/381; G06Q 20/3821; G06Q 20/38215;
(Continued)

(56) References Cited

U.S. PATENT DOCUMENTS

| | | | | |
|---|---|---|---|---|
| 11,790,334 B1 * | 10/2023 | Corcillo | ................. | G06Q 20/42 |
| | | | | 705/69 |
| 2019/0303892 A1 | 10/2019 | Yantis et al. | | |

(Continued)

OTHER PUBLICATIONS

Mell, P., 2019. Augmenting fiat currency with an integrated managed cryptocurrency. arXiv preprint arXiv:1912.06487. (Year: 2019).*
(Continued)

*Primary Examiner* — Mike Anderson
*Assistant Examiner* — John O Preston
(74) *Attorney, Agent, or Firm* — GREENBERG TRAURIG LLP

(57) ABSTRACT

Systems and methods for frictionless payments in Web 3.0 and the Metaverse are disclosed. A method may include a buyer bot: monitoring a buyer interaction with a merchant of a digital collectable via a buyer vault/digital wallet, the digital collectable having a cryptocurrency price in a cryptocurrency; determining a fiat currency price in a fiat currency for the cryptocurrency price; receiving, from the buyer vault/digital wallet, conformation of a purchase of the digital collectable at the fiat currency price; executing payment for
(Continued)

the digital collectable in the fiat currency at the fiat currency price; transforming the payment in the fiat currency to a digital collectable concierge service designated account; engaging a fiat-to-crypto on-ramp to convert the fiat currency to the cryptocurrency; and providing the payment in the cryptocurrency to a digital collectable smart contract that mints or delivers the digital collectable to the buyer.

6 Claims, 3 Drawing Sheets

(52) U.S. Cl.
CPC ... *G06Q 20/3821* (2013.01); *G06Q 20/38215* (2013.01); *G06Q 20/389* (2013.01); *G06Q 2220/00* (2013.01)

(58) Field of Classification Search
CPC ............. G06Q 20/389; G06Q 2220/00; G06Q 30/0613; G06Q 20/02; G06Q 20/065
USPC ......................................................... 705/39
See application file for complete search history.

(56) References Cited

U.S. PATENT DOCUMENTS

| | | |
|---|---|---|
| 2019/0356641 A1 | 11/2019 | Isaacson et al. |
| 2021/0174427 A1 | 6/2021 | Isaacson et al. |
| 2022/0108347 A1* | 4/2022 | Connell ............. G06Q 20/3224 |
| 2022/0122062 A1 | 4/2022 | Mayblum et al. |
| 2022/0293107 A1* | 9/2022 | Leaman ................. G06N 20/00 |
| 2024/0161090 A1* | 5/2024 | Fang ................... G06Q 20/3674 |
| 2024/0211910 A1* | 6/2024 | Lal ......................... G06Q 40/04 |

OTHER PUBLICATIONS

Botha, J.G., Singh, K. and Leenen, L., 2025. A Proposed Bitcoin Blockchain Investigation Methodology: Based on a Case Study Approach. Journal of Information Warfare, 24(1). (Year: 2025).*

García Martínez, F. and Martínez Resano, J.R., 2023. Digital assets and reporting: is there anything new under the sun ?. Revista de Estabilidad Financiera/Banco de España, 44 (primavera 2023), p. 71-98. (Year: 2023).*

Yang, Qinglin; "Fusing Blockchain and AI with Metaverse: A Survey", Cornell University Library, 201 Olin Library Cornell University Ithaca, NY 14853, Mar. 7, 2022.

Cardenas, Irvin Steve, et al.; Robonomics: The Study of Robt-Human Peer-to-Peer Financial Transactions and Agreements, Proceedings of the Web Conference 2020, New York, NY, Mar. 23, 2020.

* cited by examiner

SYSTEMS AND METHODS FOR FRICTIONLESS PAYMENTS IN Web3 AND THE METAVERSE

RELATED APPLICATIONS

This application claims priority to, and the benefit of, U.S. Provisional Patent Application Ser. No. 63/363,858, filed Apr. 29, 2022, the disclosure of which is hereby incorporated, by reference, in its entirety.

BACKGROUND OF THE INVENTION

1. Field of the Invention

Embodiments generally relate to systems and methods for frictionless payments in Web 3.0 (or Web3) and the Metaverse.

2. Description of the Related Art

Web3, which includes networks of three-dimensional virtual worlds focused on social connection, is often called the "Decentralized web" and includes both decentralized applications and decentralized finances. Both of these rely on decentralized networks and blockchain technology. The Metaverse is an example of such a network, and is a combination of Web 3.0, blockchain networks, virtual reality (VR), and gaming.

Due to its decentralized nature, payments in Web3 are conducted using cryptocurrencies. Not all Web3 users, however, want to use cryptocurrency, or are comfortable using cryptocurrency; many would rather use a fiat currency issued by a government (e.g., United States Dollars, British pound sterling).

SUMMARY OF THE INVENTION

Systems and methods for frictionless payments in Web 3.0 and the Metaverse are disclosed. According to one embodiment, a method for frictionless Web3 and Metaverse payments may include: (1) monitoring, by a buyer bot executed by a digital collectable purchasing concierge service in a Web3 or Metaverse environment, a buyer interaction with a merchant of a digital collectable via a buyer digital wallet/vault, the digital collectable having a cryptocurrency price in a cryptocurrency; (2) determining, by the buyer bot, a fiat currency price in a fiat currency for the cryptocurrency price; (3) receiving, by the buyer bot and from the buyer digital wallet/vault, conformation of a purchase of the digital collectable at the fiat currency price; (4) executing, by the buyer bot, payment for the digital collectable in the fiat currency at the fiat currency price; (5) transforming, by the buyer bot, the payment in the fiat currency to a digital collectable concierge service designated account; (6) engaging, by the buyer but, a fiat-to-crypto on-ramp to convert the fiat currency to the cryptocurrency; and (7) providing, by the buyer bot, the payment in the cryptocurrency to a digital collectable smart contract, wherein the digital collectable smart contact is configured to mint the digital collectable or to deliver the digital collectable to the buyer by writing ownership of the digital collectable to a distributed ledger.

In one embodiment, the digital collectable comprises a nonfungible token.

In one embodiment, the buyer bot monitors an audio interaction between the buyer and the merchant in the Metaverse.

In one embodiment, the method may include providing, by the buyer bot, a verifiable credential to the merchant.

In one embodiment, the merchant accepts a plurality of cryptocurrencies, and the buyer bot identifies one of the plurality of cryptocurrencies for the payment. In one embodiment, the buyer bot selects the one of the plurality of cryptocurrencies based on fiat-to-cryptocurrency exchange rates for the plurality of cryptocurrencies.

In one embodiment, the digital collectable smart contact writes ownership of the digital collectable to the distributed ledger by associating the digital collectable with a public digital wallet/vault address for the digital wallet/vault.

In one embodiment, the digital collectable smart contract is further configured to provide the payment to a merchant bot, and the merchant bot is configured to convert the cryptocurrency to fiat currency using a crypto-to-fiat off ramp.

In one embodiment, the method may include providing, by the buyer bot, real-world transaction history with the merchant to the merchant.

According to another embodiment, a system may include: a digital collectable marketplace in a Web3 or Metaverse environment; a digital collectable smart contract; a fiat-to-crypto on-ramp; a crypto-to-fiat off-ramp; and a buyer bot executed by a digital collectable purchasing concierge service electronic device. The buyer bot monitors a buyer interaction with a merchant of a digital collectable via a buyer digital wallet/vault, the digital collectable having a cryptocurrency price in a cryptocurrency, determines a fiat currency price in a fiat currency for the cryptocurrency price, receives, from the buyer digital wallet/vault, conformation of a purchase of the digital collectable at the fiat currency price, executes payment for the digital collectable in the fiat currency at the fiat currency price, transforms the payment in the fiat currency to a digital collectable concierge service designated account, engages the fiat-to-crypto on-ramp to convert the fiat currency to the cryptocurrency, and provides the payment in the cryptocurrency to the digital collectable smart contract. The digital collectable smart contact mints or delivers the digital collectable to the buyer by writing ownership of the digital collectable to a distributed ledger.

In one embodiment, the digital collectable comprises a nonfungible token.

In one embodiment, the buyer bot monitors an audio interaction between the buyer and the merchant in the Metaverse.

In one embodiment, the buyer bot provides a verifiable credential to the merchant.

In one embodiment, the merchant accepts a plurality of cryptocurrencies, and the buyer bot identifies one of the plurality of cryptocurrencies for the payment.

In one embodiment, the buyer bot selects the one of the plurality of cryptocurrencies based on fiat-to-cryptocurrency exchange rates for the plurality of cryptocurrencies.

In one embodiment, the digital collectable smart contact writes ownership of the digital collectable to the distributed ledger by associating the digital collectable with a public digital wallet/vault address for the digital wallet/vault.

In one embodiment, the system may also include a merchant bot executed by the digital collectable purchasing concierge service electronic device, wherein the digital collectable smart contract provides the payment to a merchant bot, and the merchant bot converts the cryptocurrency to fiat currency using the crypto-to-fiat off ramp.

In one embodiment, the buyer bot provides real-world transaction history with the merchant to the merchant.

According to another embodiment, a non-transitory computer readable storage medium may include instructions stored thereon, which when read and executed by one or more computer processors, cause the one or more computer processors to perform steps comprising: monitoring a buyer interaction with a merchant of a digital collectable via a buyer digital wallet/vault, the digital collectable having a cryptocurrency price in a cryptocurrency; determining a fiat currency price in a fiat currency for the cryptocurrency price; receiving, from the buyer digital wallet/vault, conformation of a purchase of the digital collectable at the fiat currency price; executing payment for the digital collectable in the fiat currency at the fiat currency price; transforming the payment in the fiat currency to a digital collectable concierge service designated account; engaging a fiat-to-crypto on-ramp to convert the fiat currency to the cryptocurrency; providing the payment in the cryptocurrency to a digital collectable smart contract, wherein the digital collectable smart contact is configured to mint the digital collectable or to deliver the digital collectable to the buyer by writing ownership of the digital collectable to a distributed ledger.

In one embodiment, the digital collectable comprises a nonfungible token.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments generally relate to systems and methods for frictionless payments in Web3 and the Metaverse. Embodiments provide buyers with the ability to conduct transactions in Web3 that, from the buyer's perspective, are conducted using fiat currency.

Although embodiments may be disclosed in the context of buyers and merchants, it should be recognized that other entities, including content creators, may participate in transactions as is necessary and/or desired.

Figure 1:
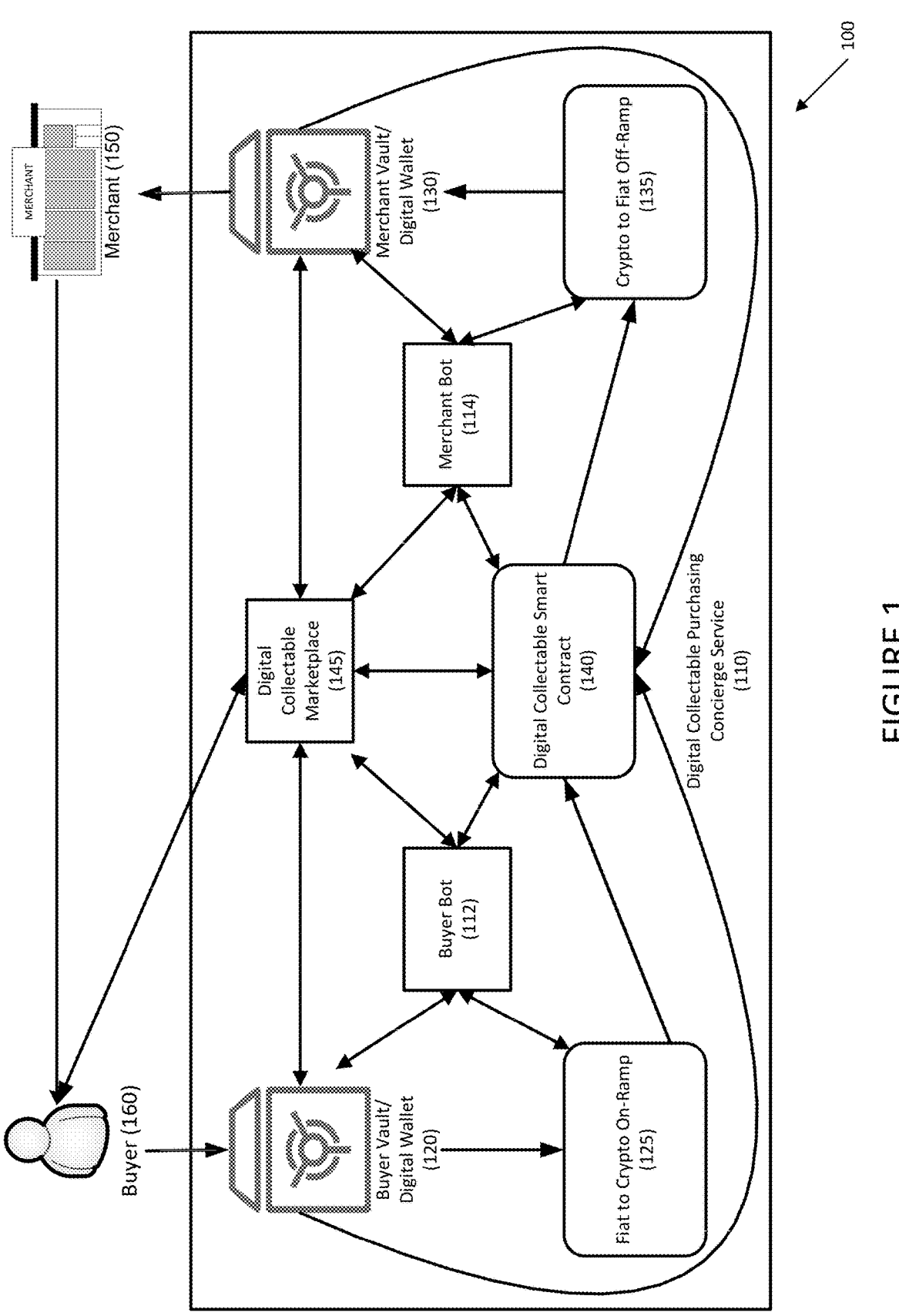
FIG. 1 depicts a system for frictionless payments in Web 3.0 and the Metaverse according to an embodiment.

Referring to FIG. 1, an architectural diagram of a system for frictionless payments in Web3 and the Metaverse is provided according to an embodiment. The system may include a buyer seeking to make a purchase of a digital collectable (e.g., a non-fungible token (NFT)) from a merchant using fiat currency via a traditional financial instrument (e.g., a credit card). The buyer may also have a digital identity that may be issued by a trusted digital identity provider.

Examples of digital identities and digital identity providers are disclosed in U.S. patent application Ser. No. 16/878, 457, filed May 19, 2020, and U.S. Provisional Patent Application Ser. No. 62/850,181, filed May 20, 2019, U.S. Provisional Patent Application Ser. No. 62/976,262 filed Feb. 13, 2020, U.S. Provisional Patent Application Ser. No. 63/126,335 filed Dec. 16, 2020, and U.S. patent application Ser. No. 17/174,650 filed Feb. 12, 2021, the disclosures of which are hereby incorporated, by reference, in their entireties.

The system may also include vaults, externally-owned account wallets, or smart contract wallets that may store cryptocurrency and digital collectables and verifiable credentials. The vaults or digital wallets may be equipped with a fiat currency to cryptocurrency on-ramp and off-ramp, enabling buyers to convert fiat currency to cryptocurrency and vice-versa, respectively.

The system may further include a smart contract. If the buyer is purchasing a digital collectable, the smart contract may be a digital collectable smart contract that, if conditions are met, may mint a digital collectable, transfer a digital collectable, verify the buyer's digital identity, verify the merchant's digital identity, etc.

In embodiments, a concierge service may be provided that may provide a seamless experience for the buyer and/or the merchant. In one embodiment, the concierge service may determine the amount of fiat currency needed for the purchase (e.g., display the cryptocurrency price in fiat currency), convert the fiat currency from the buyer's digital wallet or a vault to cryptocurrency, and transfer the cryptocurrency to the merchant's digital wallet or a vault. The merchant digital wallet or vault may also be known as a corporate digital wallet. The concierge service may also receive the digital collectable (e.g., the NFT) from the merchant and may transfer it to the buyer. In another embodiment, the digital collectable may be minted on Ethereum or another blockchain. In another embodiment, the digital collectable may be minted directly to the buyer's digital wallet or vault, which may save the buyer gas fees (i.e., the fee for conducting a transaction on the blockchain network).

In one embodiment, the concierge service may include a series of bots. For example, the bots may interface with the following smart contacts and APIs: oracles for pricing data (fiat currency to cryptocurrency), on-ramp and off-ramp providers, de-centralized exchange (DEX) smart contracts for cryptocurrency to cryptocurrency conversion, digital collectable smart contracts for minting and/or transferring digital collectables, etherscan and others for a smart gas fee decision making, decentralized identifier registry smart contacts, etc.

For example, buyers may connect their wallet to a digital collectable/metaverse site and pay for their digital collectable using a fiat currency payment instrument. After that occurs, the transfer will be made to the concierge service's current account (fiat currency account) and a bot may take the fiat currency and connect with the relevant on-ramp/off-ramp providers to swap fiat currency for relevant token (the buyer bot knows what the digital collectable is denominated in (e.g. Ethereum) and in which layer). It may connect with a DEX if that token needs to be swapped or wrapped. The bot may then use one of the available bridges if the digital collectable is on a different network.

The buyer bot may then execute on buying the digital collectable for the buyer.

If the merchant has requested for identity information from the buyer's wallet, the buyer bot will ensure it goes to the correct merchants address (e.g., verifiable credentials, non-KYC data such as buyer buying habits, etc.) if the buyer elects to share this information.

The transaction may or may not occur at the time that the buyer selects "buy." For example, if the buyer opts in to gas fee optimization, the transaction may not occur if the gas fee is above a buyer-defined threshold, an average for a certain period of time, etc.

Note that the buyer does not need to know how the fiat currency is converted, does not need to hold cryptocurrency, and does not need to worry about the layer on which the digital collectable is held, etc.

Referring to FIG. 1, a system for frictionless payments in Web 3.0 (or Web3) and the Metaverse is disclosed according to an embodiment. System 100 may include buyer vault/wallet 120 that may be associated with buyer 160. Buyer vault 120 may execute one or more bots and may access fiat-to-crypto on-ramp 125. Fiat-to-crypto on-ramp 125 may convert fiat currency to cryptocurrency. The bot executed by buyer vault/digital wallet 120 may select the cryptocurrency to convert the fiat currency to, the timing (e.g., to minimize gas fees), etc.

Digital collectable smart contract 140 may receive cryptocurrency from fiat-to-crypto on-ramp 125 and may mint a digital collectable, such as a NFT, requested by buyer 160. Digital collectable smart contract 140 may also verify credentials for buyer 160.

The digital collectables may be available in digital collectable marketplace 145, which may be pool of digital collectables, a digital collectable minting mechanism, etc. Buyer 160 may connect to digital collectable marketplace 145 to purchase one or more digital collectables.

Digital collectable smart contract 140 may cause ownership of the digital collectable to be transferred to buyer 160. Digital collectable smart contract 140 may record the updated ownership on a distributed ledger (not shown).

Fiat-to-crypto off-ramp 135 may convert cryptocurrency received from digital collectable smart contract 140 to fiat currency, which may be returned to merchant vault/digital wallet 130. Merchant vault/digital wallet 130 may execute one or more bots (not shown) that may cause the fiat currency to be transferred to merchant 150.

System 100 may further include buyer bot 112, which may be any suitable computer program executed by digital collectable purchasing concierge service 110. In one embodiment, buyer bot 112 may interface with buyer vault/digital wallet 120, fiat-to-crypto on-ramp 125, digital collectable smart contract 140, and digital collectable marketplace 145. Buyer bot 112 may identify a digital collectable purchase by buyer 160 at digital collectable marketplace 145, and may orchestrate the operation of fiat-to-crypto on-ramp 125 and the execution of digital collectable smart contract 140.

Buyer bot 112 may further receive additional information, such as pricing feeds, etc.

System 100 may optionally include merchant bot 114 for merchant 150, which may orchestrate a transaction for merchant 150. Merchant bot 114 may interface with merchant vault/digital wallet 130, crypto-to fiat off ramp 135, digital collectable smart contract 140, and digital collectable marketplace 145. Merchant bot 114 may receive preferences from merchant 150, such as currency preference (e.g. whether to receive payment in fiat currency, cryptocurrency, etc.), gas fee preferences, etc. and may implement those preferences.

Figure 2:
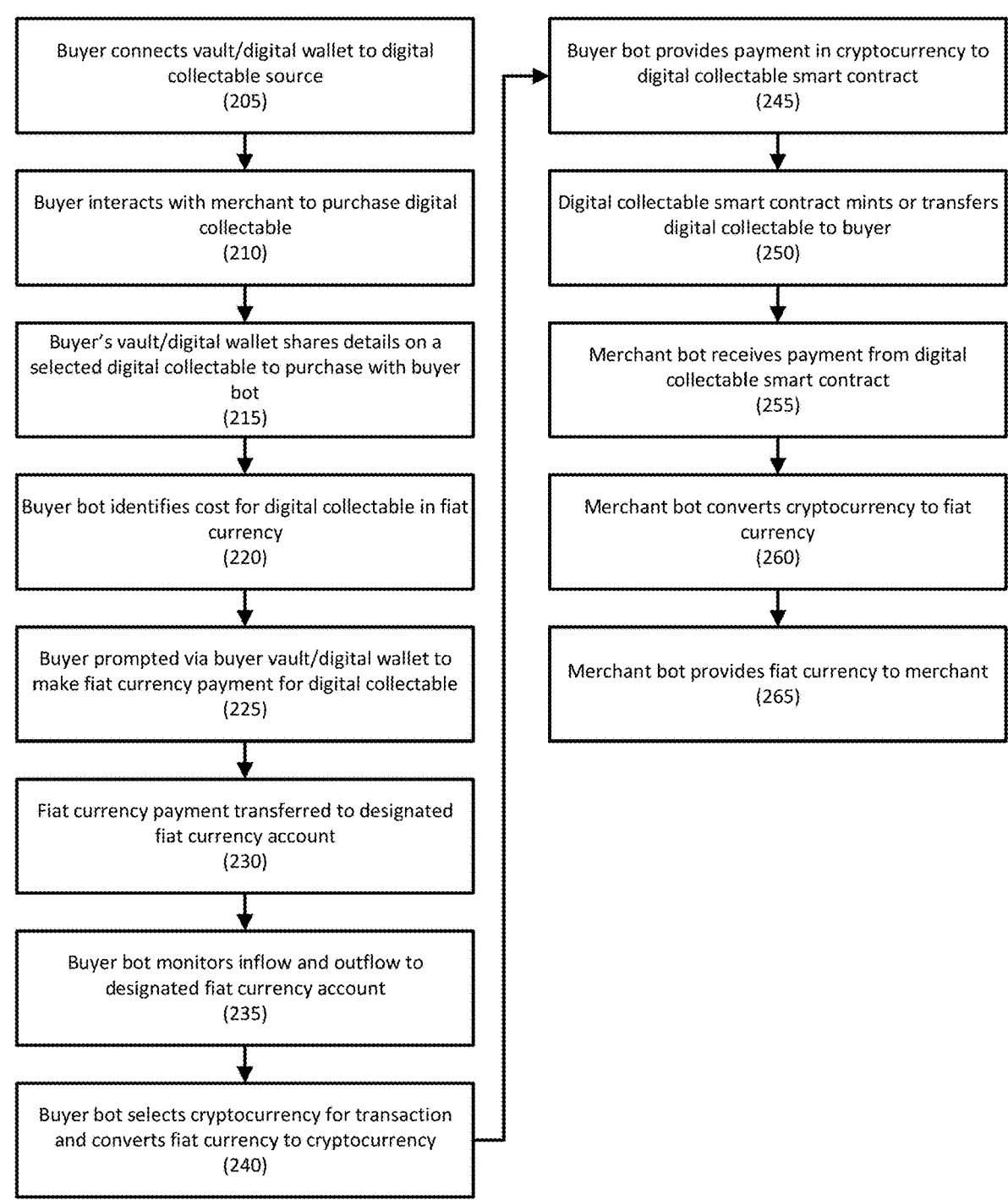
FIG. 2 depicts a method for frictionless payments in Web 3.0 and the Metaverse according to an embodiment.

Referring to FIG. 2, a method for frictionless payments in Web 3.0 (or Web3) and the Metaverse is disclosed to an embodiment.

In step 205, a buyer may connect its vault/digital wallet to a digital collectable source, such as a digital collectable marketplace. For example, the buyer may connect to the Metaverse, a NFT marketplace, a merchant shop, etc. by scanning a QR code or a bar code, by signing in using a process such as Sign In With Ethereum (SIWE), etc. SIWE and similar processes may allow additional data to be shared with merchants if desired.

The vault/digital wallet may be for fiat currency, cryptocurrency, digital collectables, etc.

In step 210, the buyer may interact with a merchant in, for example, the digital collectable marketplace, to purchase a digital collectable or other digital good. For example, the buyer may connect the buyer's vault/digital wallet to the digital collectable marketplace, such as a digital collectable marketplace.

In one embodiment, the customer may select any digital payment option as available through the vault/digital wallet. At the point of purchase, the buyer may also sign a transaction contract from the vault/digital wallet to purchase the digital collectable.

Buyers may share verifiable credentials, Know Your Customer (KYC) verification details, self-attested credentials, marketing preferences, profile preferences, social media tweet attestations, buy history (e.g., bank account attestations), etc. with the merchant. In another embodiment, buyers may be white-listed for transacting a smart contract.

The verifiable credentials do not necessarily provide the buyer's personal identifiable information, but instead proves that the buyer has been verified by a trusted entity to be a good actor. For example, the merchant may see a report in their merchant portal of the transaction hash, an inflow of cryptocurrency from the concierge address, and the buyer's verifiable credential (e.g., a digital identifier).

In one embodiment, the buyer may also opt-in to sharing other buyer information with the merchant. For example, the buyer may share information in the form of verifiable credentials on any other digital collectables they have purchased, real-world transaction history (e.g., recent real-world purchases with a particular merchant), etc. The information in the verifiable credentials may entitle the buyer to discounts (e.g., 15% off a digital collectable with the particular merchant), exclusive offers (e.g., the buyer may have access to an exclusive digital collectable based on its real-world purchases), etc.

In step 215, after the buyer's vault/digital wallet is connected to the marketplace, the buyer's vault/digital wallet may interact with a buyer bot, such as a computer program, and may share details on the selected digital collectable that the buyer is interested in purchasing.

In one embodiment, the buyer bot may monitor the buyer's interactions with the merchant and/or the digital collectable marketplace to identify a purchase transaction of the digital collectable. For example, the buyer bot may identify the purchase transaction from text and/or audio of a conversation between the buyer and the merchant.

In step 220, the buyer bot may identify the cost for the purchase transaction in fiat currency. For example, the buyer bot may use a series of pricing APIs exposed to the bot to determine the cost of the digital collectable in fiat currency.

In another embodiment, the buyer bot may receive the pricing information from an oracle.

In step 225, the buyer may be prompted by the buyer bot and via the buyer's vault/digital wallet, to make a payment in fiat currency using a credit card, a debit card, etc. For example, the buyer bot may request confirmation for the purchase based on the price in fiat currency.

In step 230, the payment may be transferred to a designated fiat currency account, such as a demand deposit account, which may be a standard business account managed by the digital collectable concierge service.

In step 235, the buyer bot may monitor the inflows and the outflow of the designated fiat currency account and acknowledge when funds have been received by the designated fiat currency account.

In step 240, the buyer bot may select a cryptocurrency for the transaction and may convert fiat currency to cryptocurrency. For example, the buyer bot may identify a target cryptocurrency, such as the cryptocurrency that is accepted by the merchant, the cryptocurrency that is identified by the merchant for the digital collectable, etc. for the fiat currency to cryptocurrency conversion. In another embodiment, if the merchant accepts different cryptocurrencies, the buyer bot may select the cryptocurrency with the best exchange rate, the lowest gas charge, etc.

The buyer bot may engage with fiat-to-crypto on-ramp and crypto-to-fiat off ramp providers as necessary to convert the fiat currency to cryptocurrency.

In step 245, the buyer bot may provide payment in cryptocurrency to a digital collectable smart contract, and in step 250, the digital collectable smart contact may mint or deliver the digital collectable to the buyer and/or the digital collectable marketplace. For example, the state of the blockchain may be updated to reflect the ownership of the digital collectible. The digital collectable will appear in the buyer's vault/digital wallet as the buyer's vault/digital wallet accesses the distributed ledger and reads the digital collectables and other items that are associated with the public address of the vault/digital wallet.

In step 255, the merchant bot may receive payment from the digital collectable smart contract, and, in step 260, the merchant bot may convert the cryptocurrency to fiat currency if desired. For example, the merchant may have a choice of receiving the payment in the native cryptocurrency of the purchased digital collectable, in a different cryptocurrency, or in a fiat currency. If the merchant elects to have either of the latter two options, the merchant bot may perform either cryptocurrency to cryptocurrency conversion, or may engage crypto-to-fiat off-ramp to convert the cryptocurrency to fiat currency. In step 265, the merchant bot may provide the fiat currency to the merchant.

In embodiments, the merchant bot may also wait to convert the cryptocurrency to minimize gas and other fees. For example, both the buyer bot and the merchant bot may apply rules based on the buyer's preferences, including preferences for when to convert fiat currency to cryptocurrency, or cryptocurrency to fiat currency.

Figure 3:
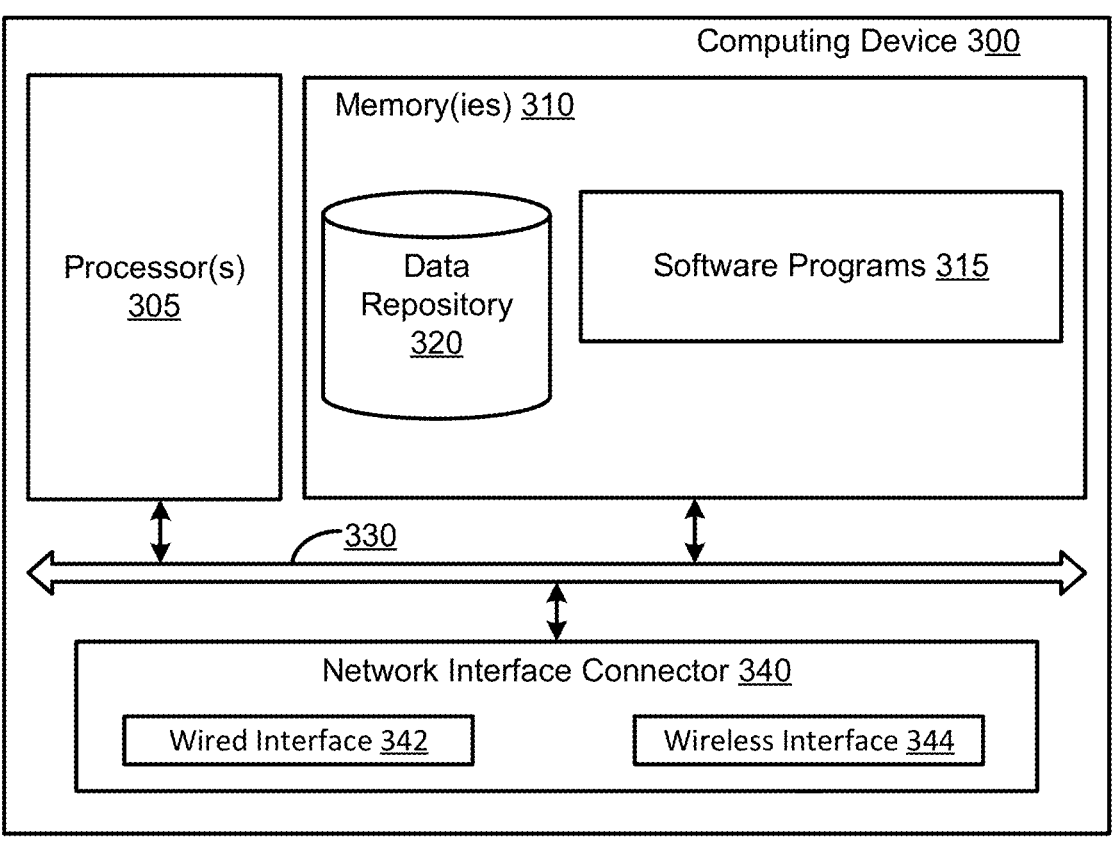
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although multiple embodiments have been disclosed, it should be recognized that these embodiments are not exclusive to one another and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a personal device, a wearable device, a programmed microprocessor, a micro-controller, a peripheral integrated circuit element, a CSIC (Customer Specific Integrated Circuit) or an ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine is used to implement embodiments that may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of non-transitory computer readable media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disk, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or a combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications, or equivalent arrangements.

What is claimed is:

1. A method for frictionless Web3 and Metaverse payments, comprising:

monitoring, by a buyer bot executed by a digital collectable purchasing concierge service in a Metaverse environment, a buyer interaction with a merchant of a digital collectable via a buyer vault/digital wallet, the digital collectable having a cryptocurrency price in a cryptocurrency, wherein the buyer bot monitors an audio interaction between the buyer and the merchant in the Metaverse;

providing, by the buyer bot, a verifiable credential to the merchant to authenticate the buyer in the Metaverse environment;

determining, by the buyer bot, a fiat currency price in a fiat currency for the cryptocurrency price, wherein the merchant accepts a plurality of cryptocurrencies and the buyer bot identifies one of the plurality of cryptocurrencies for the payment based on fiat-to-cryptocurrency exchange rates for the plurality of cryptocurrencies;

receiving, by the buyer bot and from the buyer vault/digital wallet, conformation of a purchase of the digital collectable at the fiat currency price;

executing, by the buyer bot, payment for the digital collectable in the fiat currency at the fiat currency price;

transforming, by the buyer bot, the payment in the fiat currency to an escrowed fiat payment stored in a digital collectable concierge service designated account that is an escrow account designated for and controlled by the digital collectable purchasing concierge service;

engaging, by the buyer but, a fiat-to-crypto on-ramp to convert the fiat currency to the cryptocurrency;

providing, by the buyer bot, the payment in the cryptocurrency to a digital collectable smart contract, wherein the digital collectable smart contact is configured to mint the digital collectable and to deliver the digital collectable to the buyer by writing ownership of the digital collectable to a distributed ledger including associating the digital collectable with a public vault/digital wallet address for the vault/digital wallet and wherein the digita collectable smart contract provides the payment to a merchant bot, and the merchant bot converts the cryptocurrency to fiat currency using a crypto-to fiat off-ramp; and monitoring, by the buyer bot, an on-chain mint/delivery event emitted by the digital collectable smart contract, and, responsive to detecting the on-chain event within a defined timeout period, releasing the escrowed fiat payment to a merchant account associated with the merchant and binds the on-chain event to an active Metaverse session identifier to automatically synchronize the minted digital collectable into a corresponding avatar inventory of the buyer within the Metaverse environment.

2. The method of claim 1, wherein the digital collectable comprises a nonfungible token.

3. The method of claim 1, wherein the digital collectable smart contact writes ownership of the digital collectable to the distributed ledger by associating the digital collectable with a public vault/digital wallet address for the vault/digital wallet.

4. The method of claim 1, further comprising:

providing, by the buyer bot, real-world transaction history with the merchant to the merchant.

5. A non-transitory computer readable storage medium, including instructions stored thereon, which when read and executed by one or more computer processors, cause the one or more computer processors to perform steps comprising:

monitoring a buyer interaction with a merchant of a digital collectable via a buyer vault/digital wallet, the digital collectable having a cryptocurrency price in a cryptocurrency, wherein the monitoring comprises monitoring an audio interaction between the buyer and the merchant in a Metaverse environment in which the buyer interaction occurs;

determining a fiat currency price in a fiat currency for the cryptocurrency price;

receiving, from the buyer vault/digital wallet, conformation of a purchase of the digital collectable at the fiat currency price;

executing payment for the digital collectable in the fiat currency at the fiat currency price;

transforming the payment in the fiat currency to an escrowed fiat payment stored in a digital collectable concierge service designated account that is an escrow account designated for and controlled by the digital collectable purchasing concierge service;

engaging a fiat-to-crypto on-ramp to convert the fiat currency to the cryptocurrency;

providing the payment in the cryptocurrency to a digital collectable smart contract, wherein the digital collectable smart contact is configured to mint the digital collectable and to deliver the digital collectable to the buyer by writing ownership of the digital collectable to a distributed ledger including associating the digital collectable with a public vault/digital wallet address for the vault/digital wallet and wherein the digital collectable smart contract provides the payment to a merchant bot, and the merchant bot converts the cryptocurrency to fiat currency using a crypto-to-fiat off-ramp; and monitoring an on-chain mint/delivery event emitted by the digital collectable smart contract, and, responsive to not detecting the on-chain event within a defined timeout period, automatically refunding the escrowed fiat payment to an account associated with the buyer.

6. The non-transitory computer readable storage medium of claim 5, wherein the digital collectable comprises a nonfungible token.

* * * * *